(12) United States Patent
Santais et al.

(10) Patent No.: US 9,915,160 B2
(45) Date of Patent: Mar. 13, 2018

(54) STEAM TURBINE GLAND ARRANGEMENT

(71) Applicant: ALSTOM Technology Ltd, Baden (CH)

(72) Inventors: Frederic Santais, Paris (FR); Laurent Asset, Tremblay-en-France (FR)

(73) Assignee: General Electric Technology GmbH, Baden (CH)

( * ) Notice: Subject to any disclaimer, the term of this patent is extended or adjusted under 35 U.S.C. 154(b) by 111 days.

(21) Appl. No.: 14/876,857

(22) Filed: Oct. 7, 2015

(65) Prior Publication Data

US 2016/0102569 A1    Apr. 14, 2016

(30) Foreign Application Priority Data

Oct. 14, 2014 (EP) .................................... 14290311

(51) Int. Cl.
| F01K 19/00 | (2006.01) |
| F01D 11/00 | (2006.01) |
| F01K 23/06 | (2006.01) |
| F01D 25/26 | (2006.01) |
| F02C 7/28  | (2006.01) |

(52) U.S. Cl.
CPC .......... *F01D 11/003* (2013.01); *F01D 11/001* (2013.01); *F01D 25/26* (2013.01); *F01K 23/06* (2013.01); *F02C 7/28* (2013.01); *F05D 2220/31* (2013.01); *F05D 2240/15* (2013.01); *F05D 2240/63* (2013.01); *F05D 2300/171* (2013.01)

(58) Field of Classification Search
CPC . F01D 19/00; F01K 13/02; F01K 7/16; F01K 7/40
See application file for complete search history.

(56) References Cited

U.S. PATENT DOCUMENTS

| 2,524,724    | A  * | 10/1950 | Zetterquist ............... F01D 3/04 415/107 |
| 4,393,658    | A  * | 7/1983  | Bohnenkamp .......... F01D 25/12 415/144 |
| 4,541,775    | A  * | 9/1985  | Hovan .................... F01D 5/084 415/115 |
| 6,082,962    | A  * | 7/2000  | Drosdziok ............... F01D 3/02 415/115 |
| 7,402,024    | B2 * | 7/2008  | Kriz ....................... F01D 25/26 415/213.1 |
| 8,147,192    | B2 * | 4/2012  | Jones ..................... F01D 11/24 415/173.1 |
| 9,631,514    | B2 * | 4/2017  | Onoda .................... F01D 25/12 |
| 2005/0163612 | A1 * | 7/2005  | Reigl ..................... F01D 5/084 415/198.1 |
| 2005/0238485 | A1 * | 10/2005 | Rivas ..................... F01D 5/081 415/174.5 |
| 2007/0207031 | A1   | 9/2007  | Kriz et al. |
| 2008/0019821 | A1 * | 1/2008  | Narita .................... F01D 11/02 415/103 |
| 2011/0103970 | A1 * | 5/2011  | Bekyigit .................. F01D 3/04 416/96 R |

(Continued)

*Primary Examiner* — Jesse Bogue
(74) *Attorney, Agent, or Firm* — GE Global Patent Operation; Cynthia W. Flanigan

(57) ABSTRACT

A steam turbine gland seal arrangement prevents leakage of steam from around a turbine rotor. The gland seal arrangement includes a chamber formed in a gland carrier attached to a casing component and a heat shield that partitions the chamber from the component.

6 Claims, 1 Drawing Sheet

(56) References Cited

U.S. PATENT DOCUMENTS

| | | | |
|---|---|---|---|
| 2013/0189077 A1* | 7/2013 | Tsukuda | F01D 5/14 415/92 |
| 2014/0271125 A1* | 9/2014 | Nomura | F01D 11/001 415/68 |
| 2016/0123187 A1* | 5/2016 | Leslie | F01D 25/145 415/134 |

* cited by examiner

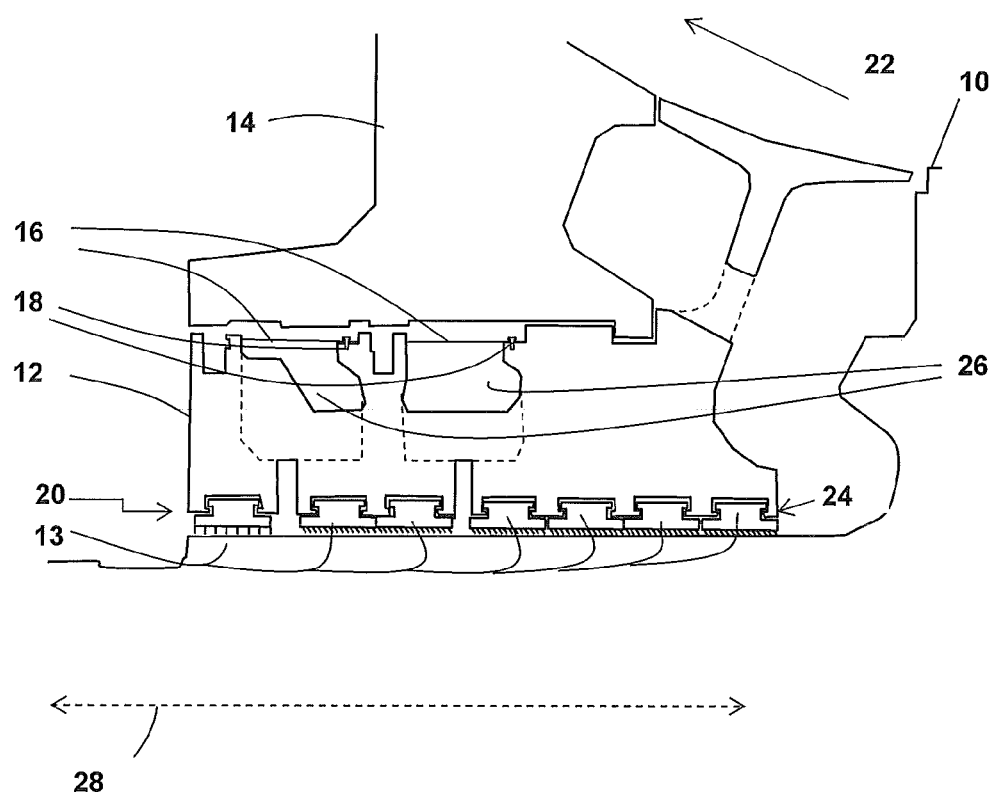

STEAM TURBINE GLAND ARRANGEMENT

CROSS-REFERENCE TO RELATED APPLICATIONS

This application claims priority to European Patent Application No. 14290311.1 filed Oct. 14, 2014, the contents of which are hereby incorporated in its entirety.

TECHNICAL FIELD

The present disclosure relates generally to steam turbines and more particularly to multi pressure steam turbine gland arrangements of a labyrinth type for reducing steam leakage between rotating and stationary components of a steam turbine.

BACKGROUND

In a steam turbine, the leakage of the turbine driving steam to the outside is typically prevented by a gland sealing system. The system typically comprises a series of at least three labyrinth packing segments located along the turbine rotor in the region where the rotor exits the turbine casing. A gland carrier casing supporting the sealing rings may form at least two chambers with the turbine casing The chamber(s) enables the ejection of a mixture of steam- air and an injection of steam, when there is more than one chamber in the upstream higher pressure chamber. Each of these chambers are separated by sealing rings or labyrinth packing segments.

As system with not less than two chambers may, for example, comprise a first chamber in which a mixture of steam/air is injected and a second chamber with in which steam is either injected or ejected depending on the operating mode. As an example, the first chamber could operate at a pressure about 0.95 bar while the second chamber could operate at a pressure about 1.15 bar.

In a typically arrangement, each of the packing segments is mounted on a gland carrier casing of the turbine. In the case where the gland carrier casing component on which the sealing rings are mounted additionally forms part of the steam turbine exhaust, the turbine casing component may be exposed to local gland chambers temperature as well as steam turbine exhaust temperature. In the case of a high and intermediate pressure steam turbine having a high pressure shaft end gland system and an intermediate pressure shaft end gland system, the temperature gradient may be 110° C. on the high pressure side and 70° C. on the intermediate pressure side. This may result in the turbine casing component being exposed to large thermal stresses.

SUMMARY

A steam turbine gland seal arrangement is disclosed that can provide a means of reducing thermal stresses in turbine casing components on which seal segments are mounted thereby improving, for example, the tightness of the typical horizontal joint plane at which upper and lower parts of a typical steam turbine casing are jointed together by reducing thermal stresses in the extremity of the casing due to steam temperature differences between the turbine exhaust and the gland exhaust chamber.

It attempts to address this problem by means of the subject matter of the independent claim. Advantageous embodiments are given in the dependent claims.

The disclosure is based on the general idea of providing a heat shield in chambers formed between and by gland carrier and a turbine casing component. The heat shields are arranged such that direct contact of the turbine casing component and steam flow in the chambers is avoided. In this way, a space between thermal shields and inner surface of the casing is created. This spaces acts as insulation thus avoiding a local cooling of the horizontal upper and lower half jointing flange, thus reducing joint distortion which in turn has the possible effect of improving joint tightness.

An aspect provides a steam turbine gland seal arrangement for preventing leakage of steam from around a turbine rotor. The gland seal arrangement comprises a turbine casing component configured to be a portion of a steam turbine exhaust, a gland carrier and a plurality of sealing segment adjacently mounted in series on the gland carrier in a turbine axial direction, for sealing along a turbine axial direction of the rotor.

The casing component and the gland carrier are configured and arranged such that at least two chambers are formed, wherein the chamber includes a heat shield extending to partition the chamber.

In an aspect, the heat shield is bolted to the gland carrier.

In another aspect, the heat shield is made of stainless steel.

Other aspects and advantages of the present disclosure will become apparent from the following description, taken in connection with the accompanying drawing, which by way of example, illustrates an exemplary embodiment of the present invention.

BRIEF DESCRIPTION OF THE DRAWINGS

By way of example, an embodiment of the present disclosure is described more fully hereinafter with reference to the accompanying drawing, in which:

FIG. 1 is a cross sectional view of a steam turbine gland seal according to a preferred embodiment of the disclosure.

DETAILED DESCRIPTION

An exemplary embodiment of the present disclosure is now described with references to the drawing, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

An exemplary steam turbine gland seal arrangement shown in FIG. 1 is mounted around a turbine rotor 10. The gland seal arrangement includes a turbine casing component 14, a gland carrier 12 mounted on the turbine casing component 14, a chamber formed by the turbine casing component 14, the gland carrier 12, and a heat shield 16 formed between the turbine casing component 14 and the gland carrier 12.

The turbine casing component 14 may be configured as a portion of a steam turbine exhaust 22. That is, the turbine casing component 14 may be configured to be partially located in a flow path region of the steam turbine downstream of turbine blades where steam is expanded. While in one exemplary embodiment, the turbine casing component 14 is made of a single piece, in another exemplary embodiment, the turbine casing component 14 is made of several pieces that are bonded, joined or welded in a way that enables thermal conduction through the turbine casing component 14.

In an exemplary embodiment shown in FIG. 1 a gland carrier 12 is a sealing carrying member whose purpose is to carry one or more sealing rings with sealing features, such as sealing brushes and/or labyrinth fins. As shown in FIG. 1, in an exemplary embodiment, at plurality of sealing rings 13 are adjacently mounted in series in a turbine axial direction 28, preferably moveably mounted, on the gland carrier 12, between the turbine casing component 14 and the turbine rotor 10. Each of the sealing rings 13 are adjacently located in a series in a turbine axial direction 28 along the turbine rotor 10 so as to provide a sealing means between a steam side 24 and an air side 20 of the sealing arrangement.

As shown in FIG. 1, in an exemplary embodiment, gland carriers 12 are configured in such a way that a chamber 26 is formed in the gland carrier 12 that faces the turbine casing component 14. In an exemplary embodiment, the chamber 26 is configured to eject a mixture of steam/air of else injection steam at a controlled pressure.

In an exemplary embodiment shown in FIG. 1, at least one chamber 26 includes a heat shield 16 covering the or each of the chambers 26 so as to partition the chamber 26 from the turbine casing component 14. The purpose of the heat shield 16 is to partition the chamber 26 in such a way that there is minimise contact of steam or steam/air flowing through the or each chamber 26 thereby minimising thermal energy transfer to the turbine casing component 14. This may be achieved by the heat shield 16 extending across the chamber 26 in an essentially turbine axial direction 28.

The heat shield 16 is most suitable made from a material that can reduce thermal exposure and is resistant to corrosion. In an exemplary embodiment the heat shield 16 is made stainless steel.

Although the disclosure has been herein shown and described in what is conceived to be the most practical exemplary embodiment, it can be embodied in other specific forms. The presently disclosed embodiment is therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A steam turbine gland seal, the steam turbine gland seal arrangement comprising:
    a turbine casing component of a steam turbine exhaust;
    a gland carrier mounted on the turbine casing component, the gland carrier comprising a plurality of sealing rings arranged in series in a turbine axial direction for sealing along a turbine axial direction of a turbine rotor;
    at least two chambers formed in the gland carrier facing the turbine casing component and configured to eject a mixture of steam/air, and
    at least one heat shield configured to cover at least one of the at least two chambers and, and wherein the plurality of sealing rings are movably mounted on the gland carrier, between the heat shield and turbine rotor.

2. The steam turbine gland seal arrangement according to claim 1, wherein the heat shield extends in the turbine axial direction.

3. The steam turbine gland seal arrangement according to claim 1, wherein the heat shield comprises bolts configured and arranged to attach the heat shield to the gland carrier.

4. The steam turbine gland seal arrangement according to claim 1, wherein the heat shield is made of stainless steel.

5. The steam turbine gland seal arrangement according to claim 1, comprising three chambers, wherein each chamber of the three chambers includes the heat shield.

6. The steam turbine gland seal arrangement according to claim 1, wherein the turbine casing component and the gland carrier form part of the steam turbine exhaust.

* * * * *